July 1, 1941.　　　J. A. LAWLER　　　2,247,508
WINDSHIELD WIPER MECHANISM
Filed March 13, 1939　　　2 Sheets-Sheet 1
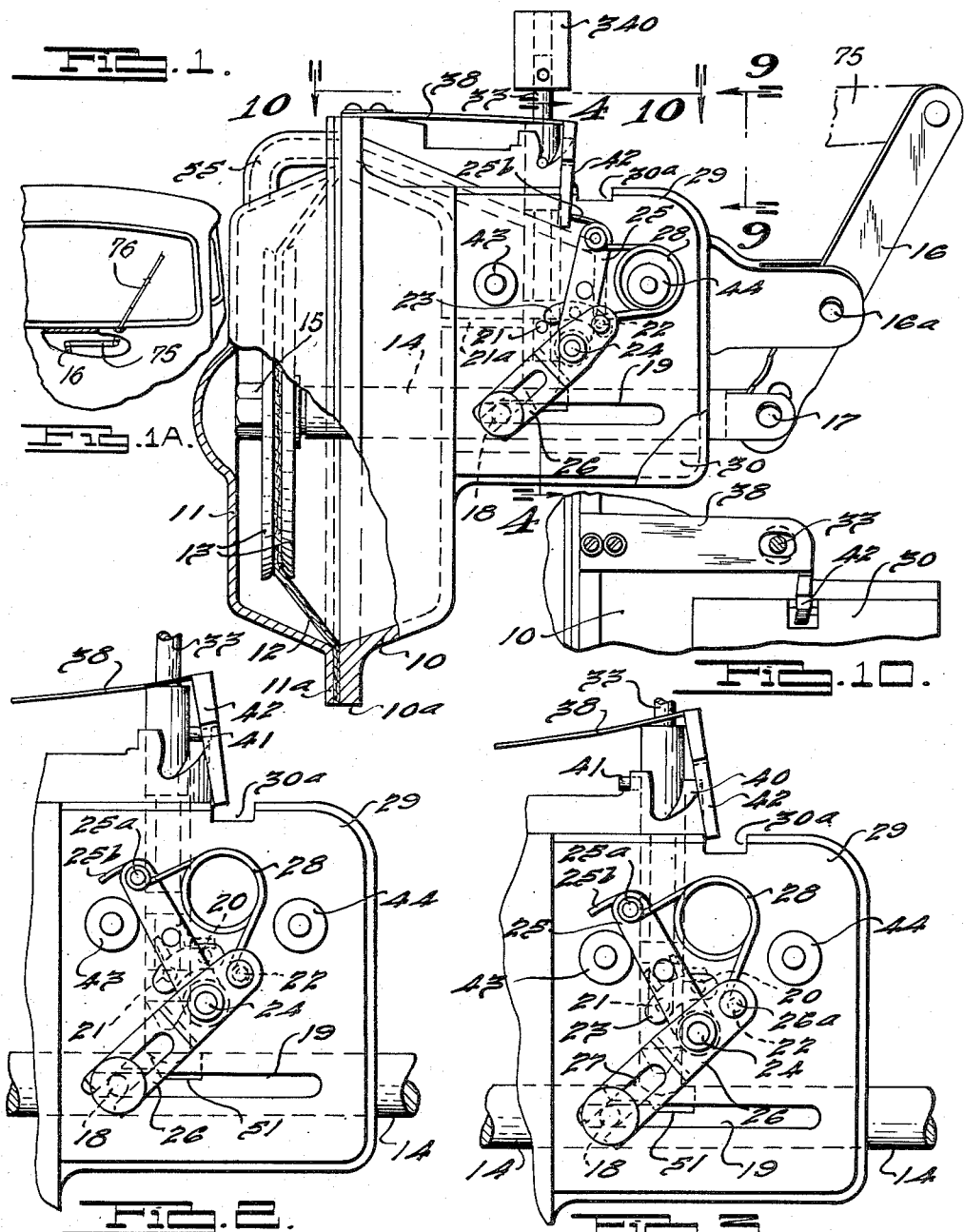
INVENTOR
Jack A. Lawler.
BY Dike, Calvert & Gray
ATTORNEYS.

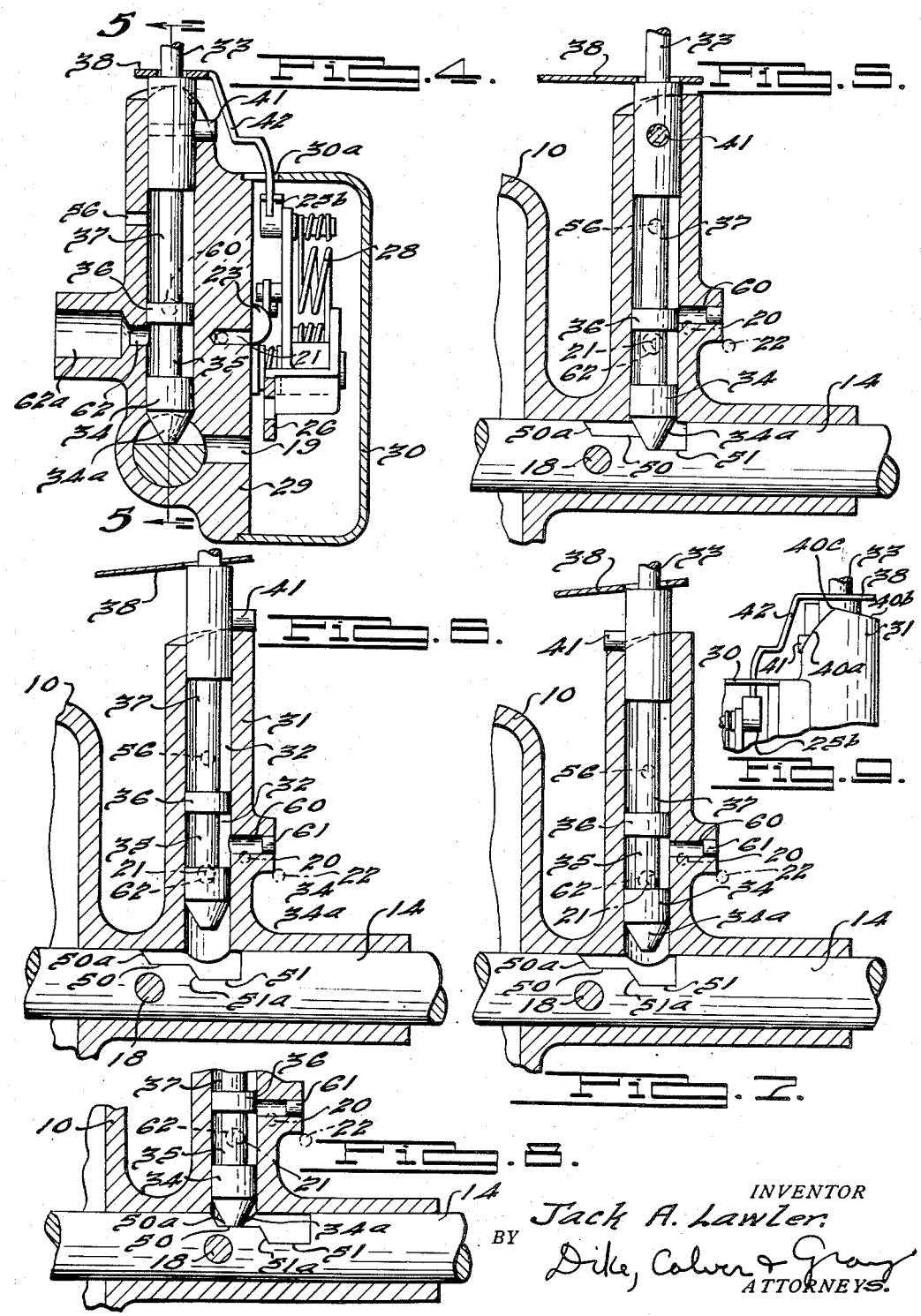

Patented July 1, 1941

2,247,508

UNITED STATES PATENT OFFICE 2,247,508

WINDSHIELD WIPER MECHANISM

Jack A. Lawler, Detroit, Mich., assignor to Marvel Equipment Corporation, Detroit, Mich., a corporation of Michigan Application March 13, 1939, Serial No. 261,446

4 Claims. (Cl. 121—164)

This invention relates to improved windshield wiper operating mechanism and more particularly to novel mechanism for actuating one or more wiper or cleaner blades wherein improved means is provided for mechanically parking the blade or blades at a predetermined point either in the normal range of travel of the blade or somewhat therebeyond, such, for example, as adjacent the upper or lower margin of the windshield of a motor vehicle.

An object of the invention is to provide windshield wiper operating mechanism of the foregoing character having means effective at predetermined times to mechanically maintain the wiper blade or blades in parked position.

Another object of the invention is to provide parking means which becomes effective to maintain the parts in parked position upon operating the control mechanism to arrest the operation of the wiper blade or blades.

A further object of the invention is to provide relatively simple, inexpensive and effective means for mechanically maintaining the valve and valve operating mechanism in parked position at predetermined times.

A further object of the invention is to provide mechanism of the foregoing character with means under the control of the operator to effect a momentary increase in the speed of travel of the wiper element just prior to parking.

A further object of the invention is to provide a mechanical parking device for a windshield wiper motor, particularly of the fluid pressure type, such device embodying, in a single control, means for regulating the speed of the motor, means for mechanically arresting and releasably holding the motor driven element, such, for example, as a shaft, in a predetermined parking position, and means for checking or blocking the snap-action valve device substantially at one limit of its operation to prevent unintended reversing action of the valve actuating mechanism prior to completion of the mechanical parking action.

A further object is to provide an improved fluid pressure motor, particularly for windshield wipers or cleaners, having a snap-action valve mechanism and a mechanical parking control together with such operative interrelation between said mechanism and parking control as to enable the parking action to occur always at one limit in the range of operation, the fluid pressure to be cut off from the motor, and the valve action blocked in order to complete the mechanical parking action regardless of variations in the operative range of travel of the motor member.

Yet a further object of the invention is to provide improved resilient means to actuate the parking control mechanism and to interrupt the operation of fluid pressure motor when it is desired to interrupt the operation of the device.

Other objects and advantages of this invention reside in the provision of an efficient and rugged windshield wiping device which may be manufactured and used economically on vehicles of all types.

The above and other objects of the invention will appear from the following description and appended claims when considered in connection with the accompanying drawings forming a part of this specification in which like reference characters designate corresponding parts in the several views.

In the drawings:

Fig. 1 is a side elevation, partly in section, illustrating a fluid pressure motor constructed in accordance with the present invention.

Fig. 1a is a partial front elevation of a vehicle, with parts broken away, showing a wiper element and parts for connecting it to a fluid pressure motor.

Fig. 2 is an enlarged fragmentary side elevational view of a poriton of the structure shown in Fig. 1 but illustrating a different position of the valve mechanism and associated parts of the motor.

Fig. 3 is a view similar to Fig. 2, illustrating another operative position of the valve mechanism and associated parts.

Fig. 4 is an enlarged sectional view taken substantially along the line 4—4 of Fig. 1, looking in the direction of the arrows, and showing the mechanism in parked position.

Fig. 5 is a sectional view taken substantially along the line 5—5 of Fig. 4, looking in the direction of the arrows.

Fig. 6 is an enlarged section showing the mechanism in the slow speed position.

Fig. 7 is an enlarged sectional view similar to Fig. 6, showing the mechanism in the high speed position.

Fig. 8 is a fragmentary enlarged section showing the parts in a different position.

Fig. 9 is an enlarged fragmentary elevational view, partly in section, taken substantially along the line 9—9 of Fig. 1, looking in the direction of the arrows; and Fig. 10 is a view taken substantially on the line 10—10 of Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, a fluid pressure motor for a windshield wiper or the like embodying the features of the present invention. It will be understood that the motor is adapted for operating either a single wiper or cleaner blade or a plurality of blades mounted to traverse a windshield or other window glass.

As seen in the drawings, the motor may comprise a casing or housing composed of two principal parts, namely one member which is in the form of a die cast chambered casing member 10 having an annular flange 10a, and a preferably pressed or stamped metal casing portion 11 also having an annular flange 11a adapted to be secured to the flange 10a by screws or the like, not shown.

The casing members 10 and 11 are formed to provide a diaphragm chamber within which is located a flexible diaphragm 12 having its peripheral edge clamped between the flanges 10a and 11a. The diaphragm 12 is composed of suitable light, flexible or resilient material and centrally mounted thereon at opposite sides are suitable reinforcing disks 13, 13 which are secured together in any desired manner as by rivets, not shown. Each diaphragm disk 13 is centrally perforated to receive a connecting rod or shaft 14, the shaft and disks being held together in any suitable manner, as by means of a nut 15. The shaft 14 is pivotally connected through a pin 17 with a wiper blade actuating bar 16. Thus reciprocation of the diaphragm 12 within the diaphragm chamber will oscillate the bar 16 about the pivot member 16a to actuate the wiper member 76. The wiper member is motivated about a suitable joint or pivot (not shown) and is connected to the actuating bar 16 by suitable means such as the connecting link 75, see Fig. 1a. The shaft or connecting rod 14 is provided with a transverse pin 18 which projects outwardly through an elongated slot 19 formed in a boss within which the shaft 14 reciprocates.

The valve actuating mechanism herein shown comprises a flat oscillatable valve 23 which alternately connects a vacuum supply port 20 with either of the ports 21 or 22 for alternately connecting the source of vacuum from ports 62 and 60, see Figs. 4 to 8 inclusive, to opposite sides of the diaphragm 12 to move the diaphragm and the shaft 14 back and forth by virtue of the difference in atmospheric and reduced pressure in the vacuum source. The valve 23 is mounted upon a pivot pin 24 which also provides a common pivot for the inner end of a kicker or intermediate actuating arm 25 and an interconnected swinging operating lever 26. The outer or lower end of the operating lever 26 is bifurcated to provide an elongated slot 27 which cooperates with the pin 18 carried by the actuating or power shaft 14. The upper or free end of the kicker arm 25 has an offset extension 25b which, at predetermined times, contacts a stop pin as will be hereinafter described. The actuating arm 25 and the operating lever 26 are connected together through the medium of an actuating spring 28 which, as shown, may be formed of wire having one or more central coils. The opposite ends of the spring are anchored upon the pins 25a and 26a which are preferably riveted to the ends of the arms or levers 25 and 26, respectively. The snap-action valve mechanism is mounted upon the flat face of the wall 29 and may be enclosed by a removable pressed metal closure plate 30.

A boss 31 having a cylindrical hole or passage 32 extending therethrough is preferably carried by the casing member 10. A plunger 33 extends through the passage 32 and is provided, preferably at its outer end with a coupling 34c to which may be connected, in any suitable manner, a control or actuating member (not shown). The actuating member may take any desired form and provides means for rotating or turning the plunger 33 to control the speed of the wiper and to effect parking thereof. The plunger has a frusto-conical inner or working end 34a adjacent which the plunger is provided with a cylindrical head or valve member 34 terminating in a reduced portion 35 at the end of which the plunger is formed with a cylindrical control valve member 36.

Beyond the valve 36 the plunger has a second reduced elongated portion 37. Resilient means, such for example as a leaf spring 38 engaging the plunger 33 may be provided to yieldingly urge the plunger and its associated control members towards the high speed position, and incidentally also toward the parking or inoperative position. The spring 38 carries an angularly disposed depending projection 42.

The boss 31 at its upper end is provided with a curved slot or ramp 40. The plunger 33 carries a pin 41 which projects through the slot 40 to vary the speed of operation of the device. As seen in Fig. 4, the casing or cover 30 is provided with a slot or opening 30a through which the projection 42 carried by the spring 38 extends when the pin 42 and its supporting plunger 33 are in parking position. In this position, the projection 42 is shown engaged by the offset extension 25b of the actuating arm 25, thus blocking the arm 25 and preventing it from swinging to the left from the position of Fig. 1 to the position of Fig. 2. It will be understood, of course, that upon rotation of the plunger 33 the projection 42 will be shifted out of blocking position with respect to the extension 25b of the valve actuating arm 25.

The flat face of the wall 29 serves to support a pair of preferably rubber covered stop pins or members 43 and 44, which operate as stops or movement limiting members for the kicker or intermediate actuating arm 25.

The power shaft or connecting rod 14 is in the present instance preferably formed with a stepped notch or recess having a shallow portion 50 and a relatively deeper portion 51, the portion 51 forming a continuation of the portion 50. When the driven shaft 14 approaches the parking position, see Fig. 8, the working end 34a of the plunger is forced by the spring 38 into the shallow notch 50 just prior to the time that the wiper blade (not shown) assumes its parked position. Upon a slight further shifting movement of the shaft 14, the end 34 of the plunger 33 drops into the deep notch 51 whereupon the shaft 14 and hence the wiper blade or blades will be retained in parked position as seen in Figs. 1, 4 and 5.

It will be understood that the chamber to the left of the diaphragm 12, as viewed in Fig. 1, is alternately subjected to atmospheric pressure and reduced pressure, or vacuum, through a conduit or passage 55 leading to the port 22 which communicates with the main supply port 20 at certain times as pointed out above. In like manner the chamber to the right of the diaphragm 12 is alternately subjected to the atmospheric pressure and reduced pressure by a drilled passage or conduit 21a leading to the port 21. The drilled passage 60 (Figs. 5-8), which is plugged at its outer end and which opens into the plunger passage 32 at its inner end, leads through angular drilled passages directly to the port 20 which communicates with the port 21 at certain times as pointed out above. The passage 32 is vented to atmosphere by a port 56 which is in communication with the vacuum supply passage 60 only when the mechanism reaches its parking position, see Fig. 5. Normally the supply conduit 60 is in communication with passage 62 which communicates with a passage 62a in a boss adapted to be connected by a hose or tube to a source of fluid pressure, such as the intake manifold of an engine. It will be seen from the arrangement that valve 36 controls the passage 60, and the valve 34 controls the passage 62 as the plunger 33 is shifted in the bore 32 between its limits of travel.

Upward movement of the plunger 33 against the action of spring 38 is accomplished by manually turning the head 34g to cause the control pin 41 to ride over the ramp-like bottom surface of the control slot 40. This slot has an abrupt inclined portion 40a (Fig. 9) terminating in a reversely inclined ramp surface 40b of less inclination, the angularity of which being sufficiently low to hold the pin 41 against movement thereon due to the action of the spring 38.

All normal speed adjustments of the motor are accomplished by movement of control pin 41 over the ramp 40b. Full low speed adjustment is obtained when the pin 41 reaches the peak 40c of the ramp and normal high speed adjustment is obtained by shifting the pin down the reversely inclined ramp surface 40b to the right in Fig. 9. When the pin passes into the steep portion 40a of the slot and the plunger is manually released the spring 38 will automatically urge the plunger 33 down the ramp 40a until the end 34a thereof rides upon the shaft 14 and drops into the notch steps 50 and 51 at parking position. In Fig. 7 the parts are illustrated in the high speed adjustment of the motor, the valve 34 being clear of the port 62, and the valve 36 being clear of the port 60, thus permitting unrestricted communication between ports 62 and 60 while closing off communication between the atmospheric vent 56 and port 60.

As the knob or head 34g is turned the pin 41 is caused to ride upwards over the ramp 40b thus elevating the plunger 33 and causing valve 34 to close off the port 62, reducing the speed of the motor. Full retarded speed is illustrated in Fig. 6 when the control pin 41 reaches the top 40c of the ramp 40b. Further rotative movement of the plunger in the same direction will move the control pin onto the steep ramp 40a permitting the spring 38 to propel the plunger 33 rapidly downward. As this occurs the valve 34 will uncover the port 62 completely, in the same manner as shown in Fig. 7, thus momentarily opening fully the vacuum line from port 62 through passage 60 and putting the motor under full power. This application of full power just prior to parking will ensure sufficient effort on the diaphragm 12 to shift the shaft 14 to the positions of Figs. 8 and 5.

In most cases, as the plunger 33 moves down from its position of Fig. 6 toward parking position, the end 34a of the plunger 33 will engage the surface of the shaft 14 to one side of the step 50 and will ride on the shaft. At this time it will be seen that the ports 62 and 60 are wide open thus ensuring full power to the motor. Regardless of what point the end 34a of the plunger 33 engages the shaft 14, the latter and hence the wiper blade will complete its cycle or continue to move until the notch 50 registers with the plunger whereupon the end 34a will drop into the notch in the shaft as shown in Fig. 8. At this point the valve 36 cuts off a portion but not all of the port 60 leaving sufficient passage therethrough so that the motor is under power sufficient to bring the locking notch 51 into registry with the plunger. As the plunger drops thereinto, communication between passages 62 and 60 will be interrupted and the passage 60 will be opened to atmosphere through the vent 56 as shown in Fig. 5.

In the parking position of Fig. 5 the shaft 14 will be locked by the detent plunger. However, since the leading sides 50a and 51a of the notches are cam shaped, a manual force applied to the wiper blade to swing the same away from parked position will move the shaft and cam the plunger out of the notches. Since this will immediately open communication between passages 62 and 60 (see position of Fig. 7) the wiper will be brought back to parked position immediately upon release of the wiper blade. When the motor is parked it will be seen that both sides of the diaphragm will be subject to atmospheric pressure, the diaphragm thus being air suspended and under no load when the motor is parked.

When the detent plunger or actuating mechanism is rotated, as above described, and released for parking the wiper, the end 34a usually will first engage the smooth face of the shaft and ride thereon while the shaft completes its reciprocatory cycle of operation. The end 34a of the plunger will first drop into the notch 50 and at this point the projection 42 carried by the spring 38, will move down into the path of the extension 25b of the valve arm 25 preventing return movement of this arm to the left in Fig. 1 and hence preventing the arm from reversing the valve. Continued movement of the shaft will permit the end 34a to drop into the final locking notch 51. Thus, in case the lever 26 passes the dead center position whereby the spring 28 will normally shift the arm 25 to the left in Fig. 1, and if this occurs before the detent 34a drops into the notch 51, the projection 42 will be in a position to block the arm 25 because of the fact that it is moved into blocking position just prior to final parking when the end 34a of the plunger 33 drops into the notch 50.

I claim:

1. In a wiping device, a movable wiping element having a substantially predetermined range of movement, a movable driving member operably connected to the wiping element, valve means comprising a plunger movable between substantially predetermined low and high speed limits to influence the speed of operation of the driving member and having an additional position beyond the high speed limit for rendering the driving member inoperative, said driving member being adapted to cooperate with said plunger when the latter is placed in said additional position, yielding means urging the plunger toward the additional position, and manually operable means to enable said yielding means to move the plunger to the last said position when the driving member approaches a substantially predetermined position.

2. In a wiping device, a movable wiping element having a substantially predetermined range of movement, a movable driving member having a bevelled slot formed in the surface thereof operably connected to the wiping element, valve means comprising a plunger having a bevelled end portion movable between substantially predetermined low and high speed limits to influence the speed of operation of the driving member and having an additional position beyond the high speed limit, yielding means urging the plunger toward the additional position, cam means to hold the plunger in predetermined positions, manually operable means to enable said yielding means to move the bevelled end portion of the plunger to engage in the bevelled slot of the driving member when the driving member approaches a substantially predetermined position.

3. In a windshield wiping mechanism, a wiping element, a source of differential fluid pressure, a differential pressure actuated motor, connecting means between the source of pressure and motor, connecting means including a drive shaft between the motor and wiping element whereby the wiping element may be driven over a substantially predetermined range of travel in opposite directions, manually operable means comprising a plunger movable between high and low speed limits to vary the speed of operation of the motor there being a control position beyond the high speed position, said drive shaft having means operatively associated therewith for coacting with said plunger when the latter is in said control position to render the motor non-operating, and resilient means urging the plunger toward the control position whereby the plunger will block movement of the motor at a substantially predetermined position.

4. In a windshield wiping mechanism, a wiping element, a source of differential fluid pressure, a differential pressure actuated motor, valve means interconnecting the source of pressure and motor, connecting means between the motor and wiping element whereby the wiping element may be driven over a substantially predetermined range of travel in opposite directions, manually operable means comprising a plunger movable between high and low speed limits to vary the speed of operation of the motor, there being an additional position beyond the high speed position, resilient means urging the plunger toward the additional position whereby the plunger will block movement of the motor at a substantially predetermined position, and stop means carried by the resilient means to hold the valve means in a predetermined position.

JACK A. LAWLER.